(12) United States Patent
Galford (10) Patent No.: US 10,451,767 B2
(45) Date of Patent: Oct. 22, 2019

(54) NEUTRON POROSITY LOG CASING THICKNESS CORRECTIONS

(71) Applicant: HALLIBURTON ENERGY SERVICES, INC., Houston, TX (US)

(72) Inventor: James Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/754,560

(22) PCT Filed: Sep. 26, 2016

(86) PCT No.: PCT/US2016/053745
§ 371 (c)(1),
(2) Date: Feb. 22, 2018

(87) PCT Pub. No.: WO2018/057035
PCT Pub. Date: Mar. 29, 2018

(65) Prior Publication Data
US 2019/0025454 A1 Jan. 24, 2019

(51) Int. Cl.
*G01V 5/10* (2006.01)

(52) U.S. Cl.
CPC .................... *G01V 5/107* (2013.01)

(58) Field of Classification Search
CPC ..................................... G01V 5/107
USPC ....................................... 250/262
See application file for complete search history.

(56) References Cited

U.S. PATENT DOCUMENTS

| | | | | |
|---|---|---|---|---|
| 4,297,575 A | * | 10/1981 | Smith, Jr. | G01V 5/125 250/265 |
| 4,423,323 A | | 12/1983 | Ellis et al. | |
| 4,445,033 A | | 4/1984 | Preeg et al. | |
| 5,182,955 A | | 2/1993 | Minette | |
| 5,627,368 A | * | 5/1997 | Moake | G01V 5/12 250/266 |
| 6,032,102 A | * | 2/2000 | Wijeyesekera | G01V 5/107 702/8 |

(Continued)

OTHER PUBLICATIONS

Al-Marzouqi, Mariam, et al. "Enhanced Gas-Saturation Determination in Abu Dhabi Offshore Reservoirs Through Integrated Pulsed and Thermal Neutron Log Approach." Abu Dhabi International Petroleum Exhibition and Conference. Society of Petroleum Engineers, 2006.

(Continued)

*Primary Examiner* — David P Porta
*Assistant Examiner* — Gisselle M Gutierrez
(74) *Attorney, Agent, or Firm* — Locke Lord LLP (57) ABSTRACT

Methods, systems, and computer program products for correcting cased hole neutron porosity logs provide a "residual" correction that substantially accounts for potential coupling between casing thickness and other environmental parameters. The residual correction may be used to derive a casing thickness response function that is customized for the particular well under consideration. The customized casing thickness response function may then be used to adjust cased hole neutron porosity logs for the well in a manner that more accurately accounts for potential coupling of the effects of casing thickness and other environmental parameters, in contrast to existing solutions that tend to ignore such potential coupling.

11 Claims, 10 Drawing Sheets

(56) References Cited

U.S. PATENT DOCUMENTS

| | | | |
|---|---|---|---|
| 7,117,092 B2* | 10/2006 | Jacobson | G01V 5/101 702/8 |
| 7,294,829 B2* | 11/2007 | Gilchrist | G01V 5/101 250/266 |
| 7,587,373 B2* | 9/2009 | Smith, Jr. | G06N 3/086 706/16 |
| 7,613,665 B2* | 11/2009 | Chen | G06N 3/086 706/16 |
| 7,791,017 B2* | 9/2010 | Stephenson | G01V 5/125 250/269.7 |
| 8,050,866 B2* | 11/2011 | Jacobson | G01V 5/101 702/8 |
| 8,065,244 B2* | 11/2011 | Chen | G06N 3/0454 706/15 |
| 8,692,185 B2* | 4/2014 | Guo | G01V 5/101 250/269.4 |
| 9,514,388 B2* | 12/2016 | Chen | G06K 9/6229 |
| 9,568,638 B2* | 2/2017 | Fitzgerald | G01V 5/101 |
| 9,897,719 B2* | 2/2018 | Stephenson | G01V 5/104 |
| 2003/0222651 A1 | 12/2003 | Tabanou | |
| 2004/0222368 A1 | 11/2004 | Odom et al. | |
| 2005/0263691 A1 | 12/2005 | Guo | |
| 2006/0243898 A1 | 11/2006 | Gilchrist | |
| 2007/0023623 A1 | 2/2007 | Trcka et al. | |
| 2008/0114547 A1* | 5/2008 | Syngaevsky | G01V 5/105 702/13 |
| 2011/0253364 A1 | 10/2011 | Mosse et al. | |
| 2011/0260044 A1 | 10/2011 | Wraight et al. | |
| 2011/0313669 A1 | 12/2011 | Thornton | |
| 2012/0068060 A1 | 3/2012 | Chace et al. | |
| 2013/0048849 A1 | 2/2013 | Li et al. | |
| 2013/0062057 A1 | 3/2013 | Smith | |
| 2013/0261974 A1* | 10/2013 | Stewart | G01V 5/045 702/8 |
| 2013/0292109 A1 | 11/2013 | Smith et al. | |
| 2013/0345983 A1* | 12/2013 | Guo | G01V 5/104 702/8 |
| 2014/0042311 A1 | 2/2014 | Zhou et al. | |
| 2014/0138529 A1 | 5/2014 | Grau et al. | |
| 2014/0138530 A1 | 5/2014 | Grau et al. | |
| 2015/0090871 A1 | 4/2015 | Chace | |
| 2015/0226049 A1 | 8/2015 | Frangos et al. | |
| 2015/0234084 A1 | 8/2015 | Thornton et al. | |
| 2015/0241577 A1 | 8/2015 | Spillane et al. | |
| 2015/0247948 A1 | 9/2015 | Zhou | |
| 2016/0109604 A1* | 4/2016 | Zeroug | E21B 47/0005 367/13 |
| 2017/0176630 A1* | 6/2017 | David | G01V 3/26 |

OTHER PUBLICATIONS

Butler, J. "A forward look at the calibration and correction of nuclear logging tools: Test pits or transputers?." SPWLA ?28th Annual Logging Symposium. Society of Petrophysicists and Well-Log Analysts, 1987.

Mimoun, Jordan G., Carlos Torres-Verdin, and William E Preeg. "Quantitative Interpretation Of Pulsed Neutron Capture Logs In Thinly-Bedded Formations." SPWLA 51st Annual Logging Symposium. Society of Petrophysicists and Well-Log Analysts, 2010.

Gafford, J.E., et al. "Improved environmental corrections for compensated neutron logs." SPE formation evaluation 3.02 (1988): 371-376.

Freitag, R. C., et al. "Field Experiences With A New Compensated Neutron Tool." SPWLA 37th Annual Logging Symposium. Society of Petrophysicists and Well-Log Analysts, 1996.

* cited by examiner

NEUTRON POROSITY LOG CASING THICKNESS CORRECTIONS

TECHNICAL FIELD

The exemplary embodiments disclosed herein relate generally to systems and methods of performing cased hole neutron porosity logs, and particularly to systems and methods of correcting cased hole neutron porosity logs to account for thicker casings in deepwater wells.

BACKGROUND

Oil and gas companies are devoting more and more resources to searching and exploring deep waters (e.g., depths of 5000 feet or more). However, deepwater exploration is an expensive undertaking due to the difficulty of operating in deepwater environments. The higher costs have led to curtailment of certain types of reservoir evaluations, such as open hole density and neutron porosity logs, in some deepwater environments. On the other hand, cased hole neutron porosity logs are increasingly being acquired in such environments because operational risks are smaller in cased holes. These neutron porosity logs can be used to supplement open hole logging programs in some deepwater environments.

One challenge facing deepwater cased hole logging operations is the casings in deepwater wells need to be thicker compared to wells in shallow waters and on land. As a result, corrections for downhole conditions that are normally applied to shallow-water and on-land neutron porosity logs may not be applicable to neutron porosity logs recorded in deepwater cased holes. The corrections are commonly plotted as individual correction charts compiled in chartbooks that were developed over many years for neutron porosity logs in both open and cased holes. For cased hole neutron porosity logs, the chartbooks typically include corrections that account for the influences that casing thickness, cement thickness, and similar environmental parameters may have on logging responses. These corrections are intended to correct logging responses produced under logging conditions that are deemed to be nonstandard to those produced under standard logging conditions.

In the chartbooks, corrections that account for cement thickness have been expanded over the years to include the effects various oil field cement mixtures can have on the cement thickness correction. However, little has been done in the industry to extend casing thickness corrections beyond approximately one-half inch, which is well short of the casing thicknesses encountered in deepwater wells. In addition, both types of corrections have typically been applied under the assumption that they are independent of other environmental parameters. That assumption, however, may not be valid in the case of casing thickness corrections, especially in deepwater wells where thicker casings and cement sheaths are common.

Presently available solutions address the deepwater correction problem by using Monte Carlo simulations to simulate an array of log responses for several combinations of formation porosity and casing thicknesses. These simulations are typically carried out using a casing inner diameter that matches the casing inner diameter under standard logging conditions. The simulations then simulate log responses for a plurality of casing thicknesses by changing the thickness of the casing while increasing the diameter of the borehole to maintain a cement thickness that corresponds to the standard cement thickness (about 1.25 inches). A correction algorithm is thereafter derived based on the simulated log responses and subsequently used to account for the thicker casings of deepwater wells.

A drawback of the above approach is, if the influence or effect that casing thickness may have on logging responses is in fact coupled with another parameter, such as borehole diameter, then the casing thickness correction, derived as described above, may not be accurate. In that case, applying the casing thickness correction may produce inaccurate results because the simulations would include the coupling, but the correction would not. An alternative approach is to simulate multiple arrays of log responses for numerous combinations and permutations of porosity and environmental parameters that depart from standard logging conditions. However, the complexity of such a multi-array simulation would be extremely difficult and expensive.

Accordingly, a need exists for an improved way to correct cased hole neutron porosity logs for casing thickness effects, especially in deepwater wells where thicker casings are common.

BRIEF DESCRIPTION OF THE DRAWINGS

For a more complete understanding of the exemplary disclosed embodiments, and for further advantages thereof, reference is now made to the following description taken in conjunction with the accompanying drawings wherein.

DESCRIPTION OF EXEMPLARY EMBODIMENTS

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

As alluded to above, the embodiments disclosed herein provide a system and method of correcting for the influence or effect of casing thickness on cased hole neutron porosity logs, especially in deepwater wells where thicker casings are common. In general, the system and method provide casing thickness corrections that are customized for a particular well by considering the effects of other environmental (i.e., downhole) parameters. More specifically, the system and method combine the influences of multiple individual downhole or environmental parameters, including the influence of casing thickness, to determine a total corrections based on a given or predefined set of environmental parameters for the well. The corrections for these individual influences are known and typically applied on an individual environmental parameter basis independently of other parameters. Next, the system and method determine a second total correction, but excluding any correction for the influence of casing thickness, based on the given set of environmental parameters for the well. The system and method then determine a difference between the total corrections including for casing thickness influence and the total corrections excluding any correction for the influence of casing thickness. This difference, referred to herein as a "residual" correction, substantially accounts for potential coupling between casing thickness and other environmental parameters, as each of these other environmental parameters was included in both total corrections. The method and system may thereafter use the residual correction to derive a casing thickness response function that is customized for the well. Such a customized casing thickness response function may subsequently be used to adjust cased hole neutron porosity logs for the well in a manner that more accurately accounts for potential coupling of the effects of casing thickness and other environmental parameters, in contrast to existing solutions that tend to ignore such potential coupling.

It should be noted that although the description herein focuses on correcting for casing thickness in deepwater wells, those having ordinary skill in the art will understand that the principles and concepts disclosed herein are equally applicable to correcting for other types of environmental parameters, such as cement thickness, borehole size, and the like.

Figure 1:
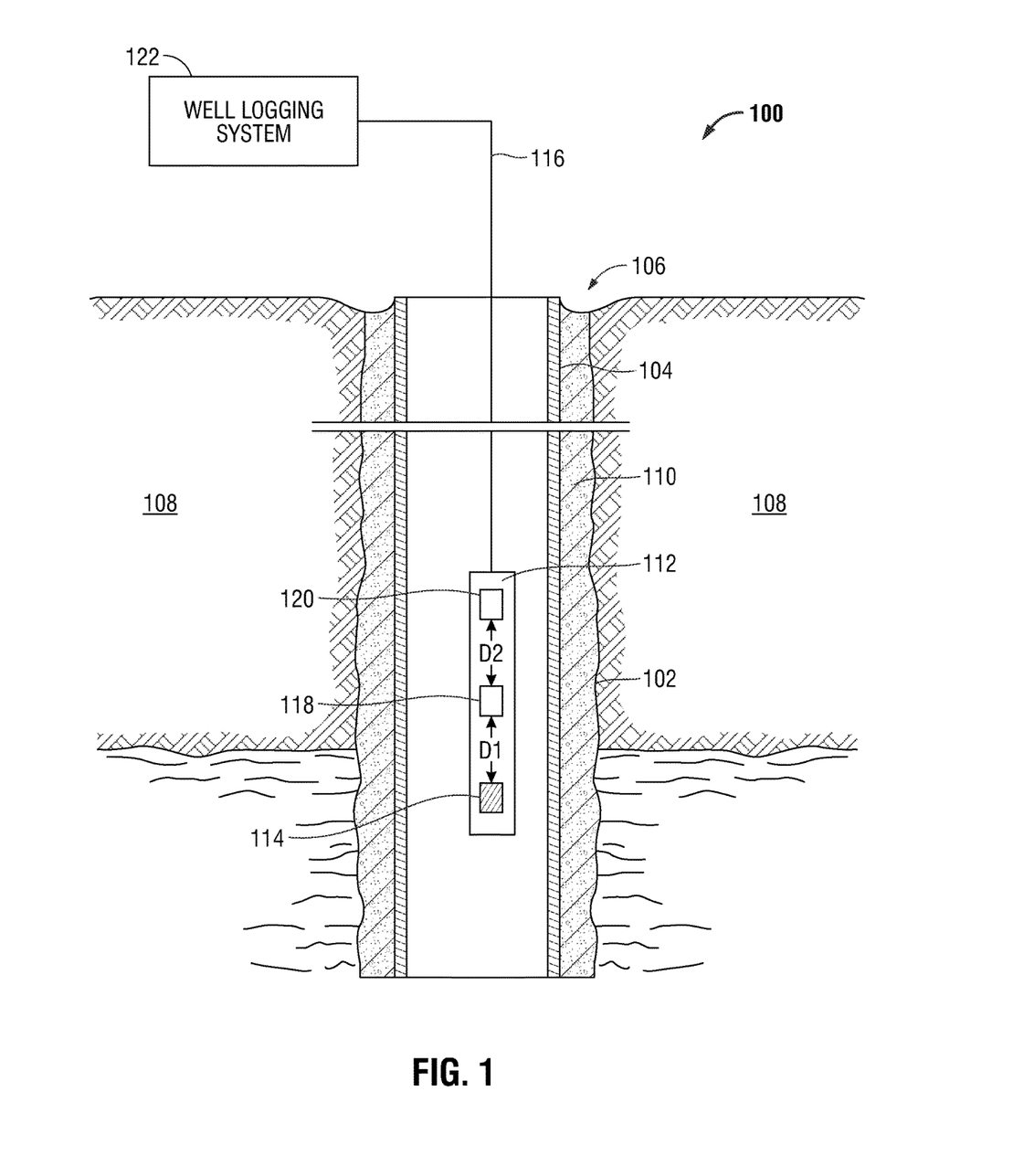
FIG. 1 illustrates an exemplary well in which a porosity log correction application may be used according to the disclosed embodiments.

Referring now to FIG. 1, a section of a well 100 is shown for producing hydrocarbon in which one or more of the embodiments disclosed herein may be employed. The well 100 may be any type of well where casing is needed, including offshore, onshore, vertical, horizontal, deviated, and in any type of subterranean formation. The particular well 100 depicted here is an offshore well where the water depth is 5000 feet or more that includes, among other things, a borehole 102 and at least one casing 104 that defines an annular space 106 between the casing and the borehole in the formation 108. The annular space 106 is typically filled with one or more types of material 110, such as cement, barite, air, or the like, at various sections along the length of the well 100.

To determine the porosity of the formation 108, a neutron logging tool 112 having a neutron source 114 coupled thereto may be lowered into the well 100 (e.g., down the casing 104). The neutron logging tool 112 may be lowered into the well 100, for example, by a wireline 116 or other suitable conveyance, such as a slickline, coiled tubing, a drill string, downhole tractor, and the like. At least one neutron detector 118 is positioned lengthwise near to the neutron source 114 and at least one neutron detector 120 is positioned lengthwise far from the neutron source 114. These neutron detectors 118, 120 may be any suitable neutron detectors known to those having ordinary skill in the art that may be used to detect neutrons returning from the formation 108. Similarly, the neutron source 114 may be any suitable neutron source known to those having ordinary skill in the art that may be used to emit neutrons into the formation 108. The distance D1 lengthwise from the neutron source 114 to the near detector 118 and the distance D2 lengthwise from the near detector 118 to the far detector 120 may be selected as needed for optimal effect depending on the length of the neutron logging tool 112.

A well logging system 122 having one or more of the embodiments disclosed herein receives neutron count rates (counts/seconds) from the near and far neutron detectors 118, 120 via a suitable telemetry unit (not expressly shown). The well logging system 122 may be located either at the surface of the formation 108 proximate to the well 100 or at another remote facility. It is also possible to locate the well logging system 122 or a portion thereof in the neutron logging tool 112 itself for near real-time in-situ processing. The well logging system 122 may then use the neutron count rates detected by the near detector 118 and the far detector 120 to calculate a near-to-far ("N/F") neutron count ratio for the well 100. Such a N/F neutron count ratio may thereafter be used, among other things, to estimate the porosity of the formation 108.

Because the well 100 is in deep water, the casing 104 typically has a greater thickness (e.g., 0.5 inches or more) compared to wells that are on land or in shallow water. The thicker casing 104, however, may cause cased hole neutron porosity logs from the well logging system 122 to be less accurate due to limitations in existing casing thickness correction charts. Therefore, in accordance with the disclosed embodiments, the well logging system 122 may also include a customized casing thickness response function, described in more detail later herein, that is developed specifically for the well 100. The customized casing thickness response function allows cased hole neutron porosity logs for the well 100 to be adjusted more accurately to account for the thicker deepwater casing 104.

Figure 2:
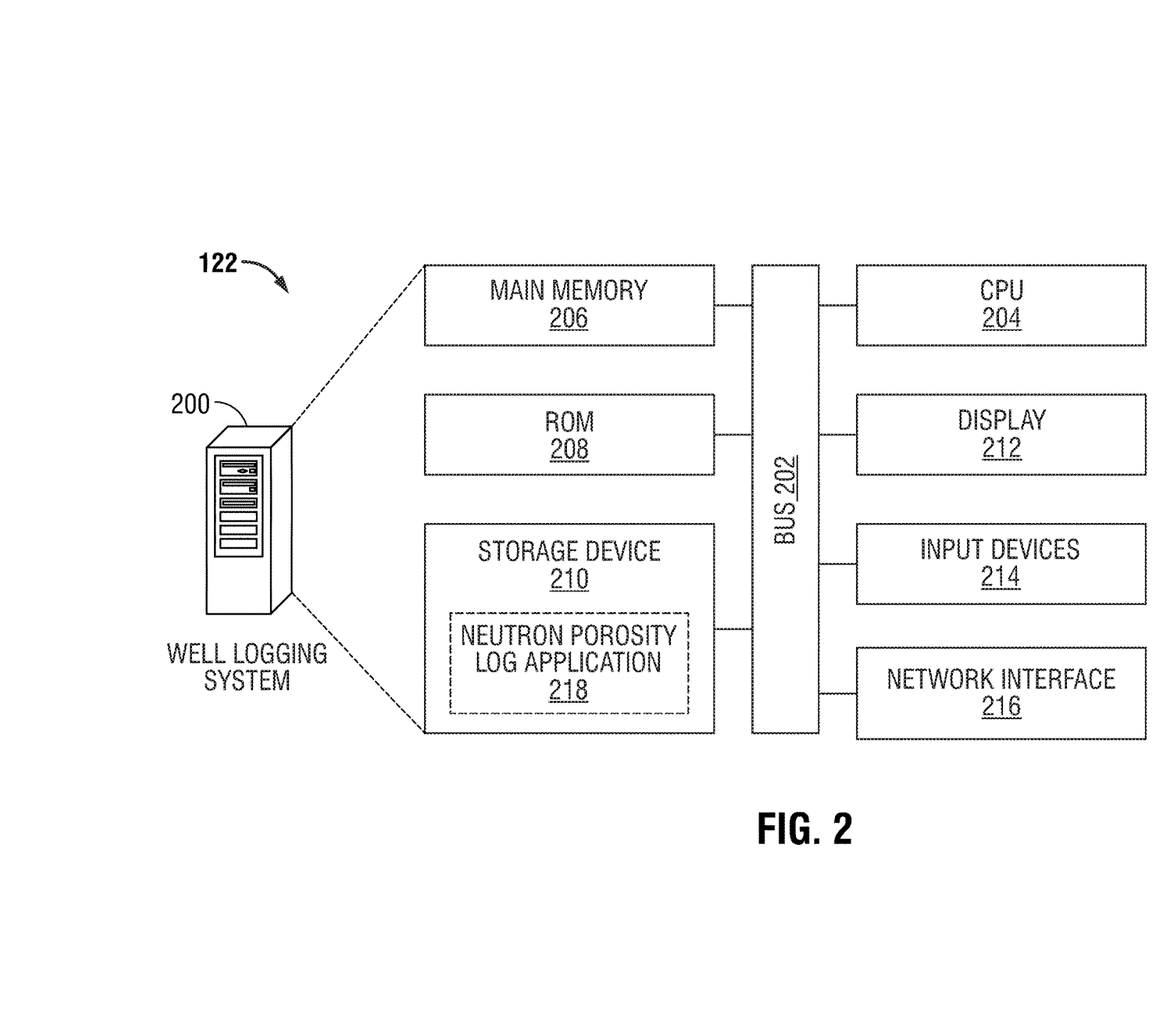
FIG. 2 illustrates an exemplary system that may be used to run the porosity log correction application according to the disclosed embodiments.

FIG. 2 illustrates an exemplary implementation of the well logging system 122 according to the embodiments disclosed herein. In general, the well logging system 122 may include a computing system, such as a workstation, desktop, or laptop computer, indicated at 200, or it may include a custom computing system developed for a particular application. In a typical arrangement, the computing system 200 includes a bus 202 or other communication pathway for transferring information among other components within the computing system 200, and a CPU 204 coupled with the bus 202 for processing the information. The computing system 200 may also include a main memory 206, such as a random access memory (RAM) or other dynamic storage device coupled to the bus 202 for storing computer-readable instructions to be executed by the CPU 204. The main memory 206 may also be used for storing temporary variables or other intermediate information during execution of the instructions by the CPU 204.

The computing system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more input devices 214, including alphanumeric and other keyboards, mouse, trackball, cursor direction keys, and so forth, may be coupled to the bus 202 for transferring information and command selections to the CPU 204. A communications interface 216 may be provided for allowing the computing system 200 to communicate with an external system or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including the wires of the bus 202. Transmission itself may take the form of electromagnetic, acoustic or light waves, such as those generated for radio frequency (RF) and infrared (IR) data communications. Common forms of computer-readable media may include, for example, magnetic medium, optical medium, memory chip, and any other medium from which a computer can read.

In accordance with the disclosed embodiments, a neutron porosity log application 218, or the computer-readable instructions therefor, may also reside on or be downloaded to the storage device 210 for execution. The neutron porosity log application 218 may be a standalone tool or it may be part of a larger suite of tools that may be used to obtain an overall evaluation of the well 100. Such a neutron porosity log application 218 may be implemented in any suitable computer programming language or software development package known to those having ordinary skill in the art, including various versions of C, C++, FORTRAN, and the like. Users may then use the neutron porosity log application 218 to obtain cased hole neutron porosity logs and to correct such logs to more accurately account for casing thickness, especially in deepwater wells where thicker casings are common.

Figure 3:
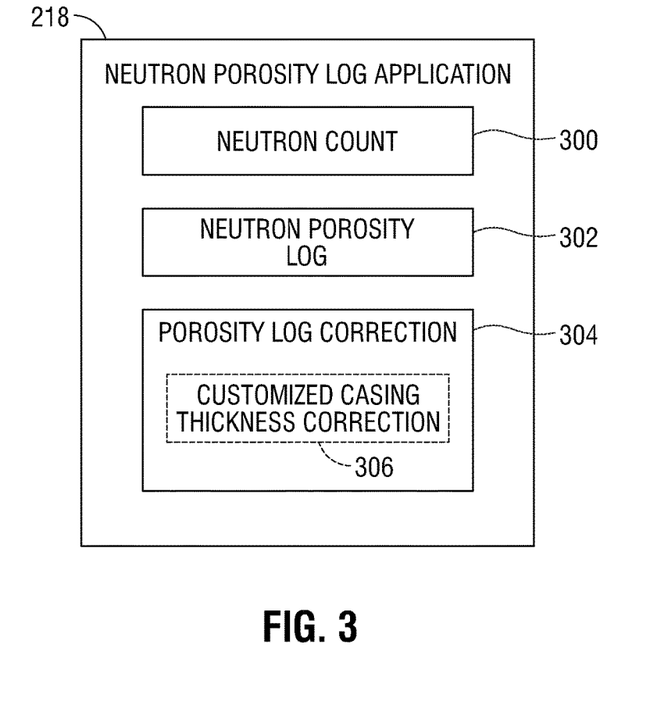
FIG. 3 illustrates an exemplary porosity log correction application according to the disclosed embodiments.

An exemplary implementation of the neutron porosity log application 218 is depicted in FIG. 3. In this implementation, the application 218 has a number of functional components, including a neutron count component 300, a porosity log component 302, a porosity log correction component 304, and a casing thickness correction component 306. Note that although the various components 300-306 are depicted here as discrete blocks, it should be understood that any block may be divided into two or more constituent blocks and that two or more blocks may be combined to form a single block without departing from the scope of the exemplary disclosed embodiments.

In general operation, the neutron count component 300 is primarily responsible for obtaining or otherwise acquiring the neutron count rates detected by the near and far detectors 118, 120, either in real time or on a delayed basis. In some embodiments, the neutron count rates may be beneficially obtained in conjunction with a conventional neutron logging operation (e.g., a cased hole neutron log) using the neutron source 114. Alternatively, the neutron detectors 118, 120 may be used to detect the neutron count rates independently of any conventional neutron logging operation, but with the same neutron source 114 as the conventional neutron logging operation.

Once the neutron count rates are acquired, the neutron count component 300 provides these neutron count rates, or data representing same, to the porosity log component 302. This component is primarily responsible for recording or otherwise obtaining a neutron porosity log for the well 100. To this end, the porosity log component 302 may calculate a N/F neutron count ratio for the well 100 using the neutron count rates. In some embodiments, the porosity log component 302 may calculate the N/F neutron count ratio using Equation (1) below or suitable variations thereof. The porosity log component 302 may thereafter convert the N/F neutron count ratios to porosity values to provide the neutron porosity log. A ratio-to-porosity transform known to those having ordinary skill in the art may be used to convert the N/F neutron count ratios to porosity values. Alternatively, a neutron porosity log for the well 100 may be obtained separately from operating or well service companies and the like.

$$N/F = \frac{\text{Near Detector Neutron Count Rate}}{\text{Far Detector Neutron Count Rate}} \qquad (1)$$

For deepwater wells like the well 100, the downhole conditions under which the neutron porosity log was obtained are considered to be nonstandard and adjustments normally need to be made to correct the log to standard logging conditions. This is primarily the task of the porosity log correction component 304. In some embodiments, the porosity log correction component 304 may use known correction algorithms to adjust the neutron porosity log on an individual environmental parameter basis independently of other environmental parameters. Examples of environmental parameters may include casing inside diameter, casing fluid density (i.e., mud weight), casing fluid salinity (i.e., mud salinity), formation temperature, formation pressure, and the like. However, because the well 100 has a thicker casing 104 compared to wells in shallow waters and on land, casing thickness corrections that are normally applied to shallow-water and on-land neutron porosity logs may not be applicable to the well 100.

In accordance with the disclosed embodiments, the porosity log correction component 304 may include a customized casing thickness correction component 306. The customized casing thickness correction component 306 operates, or may be operated, to provide a casing thickness correction that specifically accounts for the thicker casing 104 of the well 100. In some embodiments, the customized casing thickness correction component 306 may accomplish the customized correction by combining individual environmental parameter influences, including the casing thickness influence, to determine a total correction based on a set of environmental parameters for the well 100. Because the casing thickness influence is included in the total correction, any coupling between the effect of the casing thickness and other environmental parameters is also included in the total correction.

The customized casing thickness correction component 306 may then determine another, similar total correction, but excluding any correction for the casing thickness influence. The customized casing thickness correction component 306 may thereafter determine a difference between the total corrections including the casing thickness influence and the total corrections excluding the casing thickness influence. This difference, or residual correction, provides a more accurate measure of the correction needed for casing thickness influences compared to existing casing thickness corrections. The reason is because determining the residual correction isolates the influence of casing thickness from other environmental parameter influences, as these other environmental parameter influences are subtracted out in the process. The customized casing thickness correction component 306 may then derive, or may be used to derive, a customized casing thickness response function for the well 100 based on the residual correction, as described below.

Figure 4:
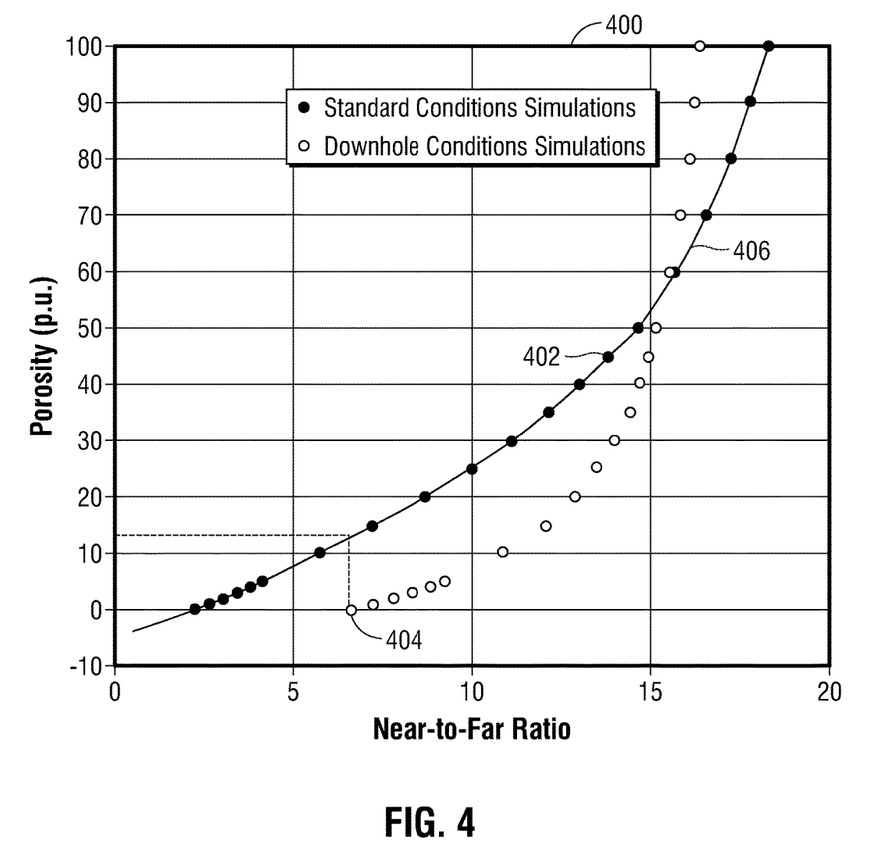
FIG. 4 illustrates exemplary neutron logging tool responses simulated under standard logging conditions and deepwater conditions according to the disclosed embodiments.

Referring now to FIG. 4, a simulated plot 400 is shown depicting simulated neutron logging tool responses for a well similar to the well 100 of FIG. 1. In the figure, the horizontal axis represents N/F neutron count ratios and the vertical axis represents true or actual porosity in porosity units (p.u.). The neutron logging tool responses in FIG. 4 were simulated using Monte Carlo simulations based on known details of the tool design. Any suitable Monte Carlo nuclear transport code may be used to carry out the simulations, including the Los Alamos National Laboratory Monte Carlo N-particle code (MCNP). The simulations modeled an array of neutron logging tool responses over a range of actual porosity values (e.g., 0 to 100 p.u.). The model took into account all environmental parameters that those having ordinary skill in the art would need to describe the downhole conditions for the well, including borehole and casing dimensions, cement type, casing fluid, temperature, pressure, and the like.

In FIG. 4, porosity points 402 represent log responses under standard logging conditions while porosity points 404 represent log responses under deepwater conditions (e.g., Gulf of Mexico). Line 406 represents a response function for the standard condition log responses 402 and was fitted using known curve fitting techniques. As can be seen, the deepwater log responses 404 are quite different from the standard condition log responses 402 and would normally need to be corrected to bring them to the standard logging conditions.

Figure 5:
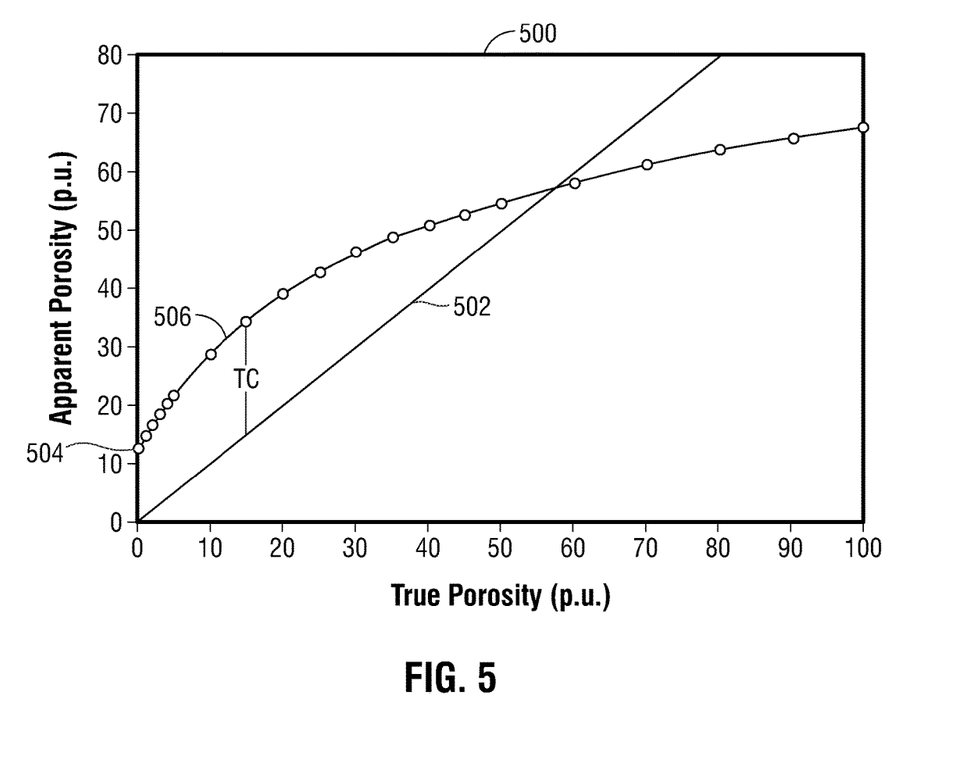
FIG. 5 illustrates apparent porosity for the simulated deepwater responses of FIG. 4 according to the disclosed embodiments.

FIG. 5 illustrates a simulated plot 500 showing the deepwater log responses 404 from FIG. 4 in terms of apparent porosity (i.e., porosity that would be detected by a neutron logging tool) versus true porosity. This alterative view makes it easier to see the amount of correction needed to bring the deepwater log responses 404 to standard logging conditions. In this figure, the horizontal axis represents true or actual porosity and the vertical axis represents apparent porosity. Line 502 represents the true formation porosity for a given apparent porosity and is ideally the same as the given apparent porosity. Apparent porosity points 504 are the deepwater log responses 404 from FIG. 4 projected vertically to the response function 406, then left to the vertical axis. Thus, for example, projecting the leftmost deepwater log response 404 from FIG. 4 vertically to the response function 406, then left to the vertical axis produces the leftmost apparent porosity point 504 in FIG. 5 (see dashed lines in FIG. 4). Line 506 represents the response function for the apparent porosity points 504, again fitted using known curve fitting techniques.

From FIG. 5, it can be seen that the amount of correction needed to bring the deepwater log responses 404 to standard logging conditions is equal to the vertical distance from the apparent porosity points 504 to the true porosity line 502. This correction, indicated by line segment "TC" in the figure, represents the total corrections that would be needed to restore the apparent (uncorrected) deepwater log responses to the true porosity values that would have been observed had the log been recorded under standard logging conditions. In some embodiments, this total corrections represents the combination of all individual influences for the set of environmental parameters (i.e., parameters that those skilled in the art would need to describe the downhole conditions) for the well, including the influence of casing thickness.

Table 1 below illustrates an exemplary set of individual corrections in porosity units for an exemplary set of environmental parameter influences across an exemplary range of porosities. In the example of Table 1, Parameter A may be casing thickness for illustrative purposes, while Parameters B, C, and so forth represent other environmental parameters. A correction (e.g., from well-known chartbooks) is provided for each environmental parameter to correct for the influences or effects of that parameter at each porosity. The last row of Table 1 shows the total correction for each porosity and may be determined, for example, by summing the individual environmental parameter corrections for each porosity. Of course, variations of the approach discussed herein, such as adding an offset or applying a weighting factor to certain corrections, may also be used without departing from the scope of the disclosed embodiments.

TABLE 1

|         | Porosity 1       | Porosity 2       | Porosity 3       | . . . | Porosity N       |
|---------|------------------|------------------|------------------|-------|------------------|
| Param A | Correction 1A    | Correction 2A    | Correction 3A    | . . . | Correction NA    |
| Param B | Correction 1B    | Correction 2B    | Correction 3B    | . . . | Correction NB    |
| Param C | Correction 1C    | Correction 2C    | Correction 3C    | . . . | Correction NC    |
| . . .   | . . .            | . . .            | . . .            | . . . | . . .            |
| Param Z | Correction 1Z    | Correction 2Z    | Correction 3Z    | . . . | Correction NZ    |
| Total   | Sum of 1A-1Z     | Sum of 2A-2Z     | Sum of 3A-3Z     | . . . | Sum of NA-NZ     |

Figure 6:
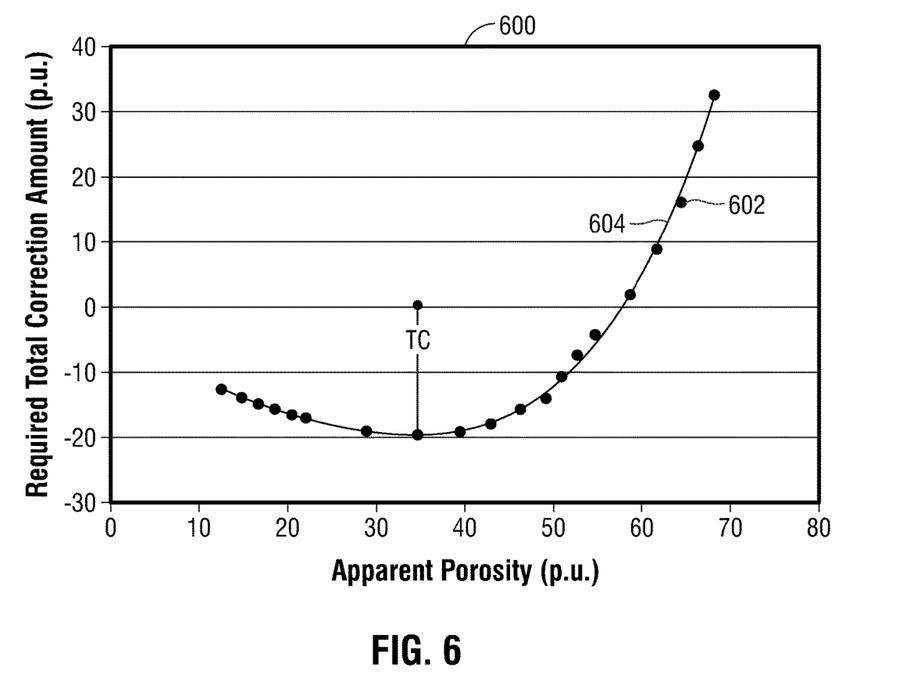
FIG. 6 illustrates total corrections needed, including correction for casing thickness influences, to correct the simulated deepwater responses from FIG. 4 to standard logging conditions according to the disclosed embodiments.

The total corrections (i.e., bottom row of Table 1) are graphically depicted in FIG. 6, which is a simulated plot 600 where the horizontal axis is apparent porosity and the vertical axis is the total amount of correction needed in porosity units (p.u.). In this figure, total correction points 602 reflect the vertical distance from the apparent porosity points 504 of FIG. 5 to the true porosity line 502 therein. Thus, for example, line segment TC in FIG. 5 represents a correction of approximately −20 porosity units, and this correction is depicted as a corresponding line segment TC in FIG. 6. Line 604 represents a response function for the total correction points 602 and was fitted using known curve fitting techniques.

In FIG. 6, as noted above, the total corrections depicted include correction for the influence of casing thickness (i.e., Parameter A of Table 1). In accordance with the disclosed embodiments, the customized casing thickness correction component 306 may operate, or be operated, to take the difference between the total corrections (i.e., sum of all the individual corrections), including for the influence of casing thickness, and the total corrections (i.e., sum of all the individual corrections), except for casing thickness. The second total corrections is illustrated in Table 2, which shows an exemplary set of corrections where casing thickness (i.e., Parameter A) has been excluded.

TABLE 2

|  | Porosity 1 | Porosity 2 | Porosity 3 | ... | Porosity N |
|---|---|---|---|---|---|
| ~~Param A~~ | ~~Correction 1A~~ | ~~Correction 2A~~ | ~~Correction 3A~~ | ... | ~~Correction NA~~ |
| Param B | Correction 1B | Correction 2B | Correction 3B | ... | Correction NB |
| Param C | Correction 1C | Correction 2C | Correction 3C | ... | Correction NC |
| ... | ... | ... | ... | ... | ... |
| Param Z | Correction 1Z | Correction 2Z | Correction 3Z | ... | Correction NZ |
| Total | Sum of 1B-1Z | Sum of 2B-2Z | Sum of 3B-3Z | ... | Sum of NB-NZ |

Figure 7:
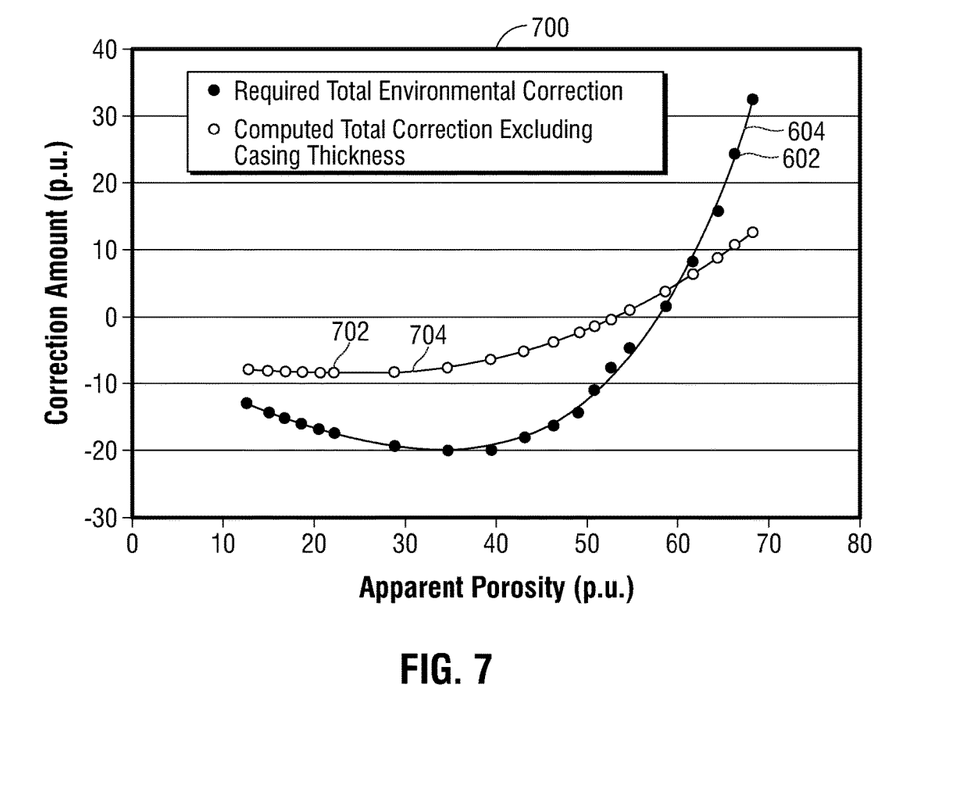
FIG. 7 illustrates the total corrections needed excluding any correction for casing thickness influences for the simulated deepwater responses from FIG. 4 according to the disclosed embodiments.

The total corrections excluding casing thickness correction (i.e., bottom row of Table 2) are graphically depicted in FIG. 7, which is another simulated plot 700 similar to the simulated plot 600 of FIG. 6 where the horizontal axis is again apparent porosity and the vertical axis is again the total amount of correction needed in porosity units (p.u.). In FIG. 7, total correction points 702 reflect the total corrections that would be needed to restore the apparent (uncorrected) deepwater log responses to true porosity values, except the casing thickness correction is excluded. Line 704 represents a response function for the total correction points 702 (excluding casing thickness correction) and was fitted using known curve fitting techniques. Total correction points 602 and response function 604 are the same ones from FIG. 6.

The customized casing thickness correction component 306 may thereafter determine, as explained above, a difference between the total correction points 602 including for casing thickness influences and the total correction points 702 excluding casing thickness influences to obtain a residual correction. In some embodiments, the customized casing thickness correction component 306 may perform the determination by simply subtracting the bottom row of Table 2 from the bottom row of Table 1 to obtain the residual correction. This residual correction quantifies the casing thickness influence free of any coupling with other environmental parameters because the Monte Carlo simulated log responses represent (or include) the sum of all the individual corrections. The customized casing thickness correction component 306 may thereafter use the residual correction to derive a casing thickness response function that is customized for the particular well being simulated.

Figure 8:
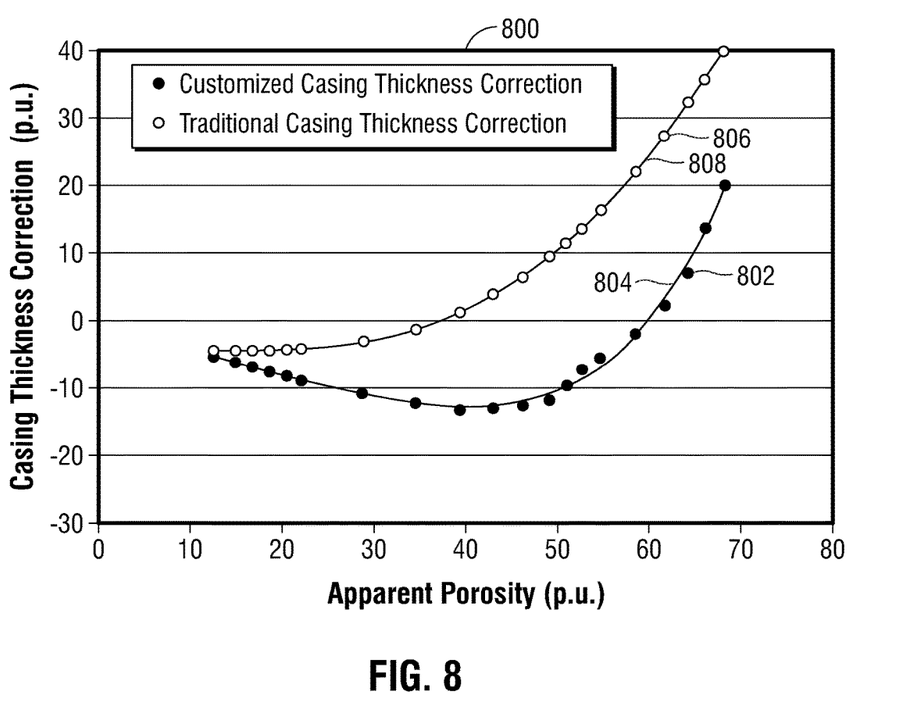
FIG. 8 illustrates the difference between the total corrections needed including correction for casing thickness influences and the total corrections needed excluding casing thickness influences from FIG. 7 according to the disclosed embodiments.

The customized casing thickness response function is graphically illustrated in FIG. 8, where the horizontal axis is again apparent porosity and the vertical axis is the amount of casing thickness correction needed in porosity units (p.u.). In FIG. 8, residual correction points 802 represent the casing thickness correction derived above that would be needed to restore the apparent (uncorrected) deepwater log responses to the true porosity values, while line 804 represents a customized casing thickness response function fitted to the residual correction points using known curve fitting techniques. Traditional casing thickness correction points 806 are also displayed for comparison purposes, with line 808 representing a response function fitted to the traditional casing thickness correction points 806 using known curve fitting techniques. As can be seen, at lower apparent porosity values (e.g. about 10 p.u.), the difference between the two response functions 804 and 808 is small, but this difference becomes more significant at higher apparent porosity values (e.g., about 20 p.u.).

In some embodiments, the customized casing thickness response function 804 may be implemented in the form of an equation, for example, a 5th order polynomial, as shown in Equation 2 below, where $\Delta\phi_{casing\_thickness}$ is the casing thickness correction, $\phi_a$ is the apparent neutron porosity, and a, b, c, d, e, and f are coefficients of the fitted casing thickness response function. Such an equation may then be applied to neutron porosity logs obtained for the specific well in order to correct for casing thickness. For example, real-time and/or post-acquisition neutron porosity computer processing codes may be designed to accept inputs corresponding to the coefficients of the 5th order equation that define the customized casing thickness response function. In that case, supplying a set of coefficients for the customized casing thickness response function may advantageously cause the computer processing code to apply the customized correction instead of the traditional casing thickness corrections.

$$\Delta\phi_{casing\_thickness} = a\phi_a^5 + b\phi_a^4 + c\phi_a^3 + d\phi_a^2 + e\phi_a + f \qquad (2)$$

Figure 9:
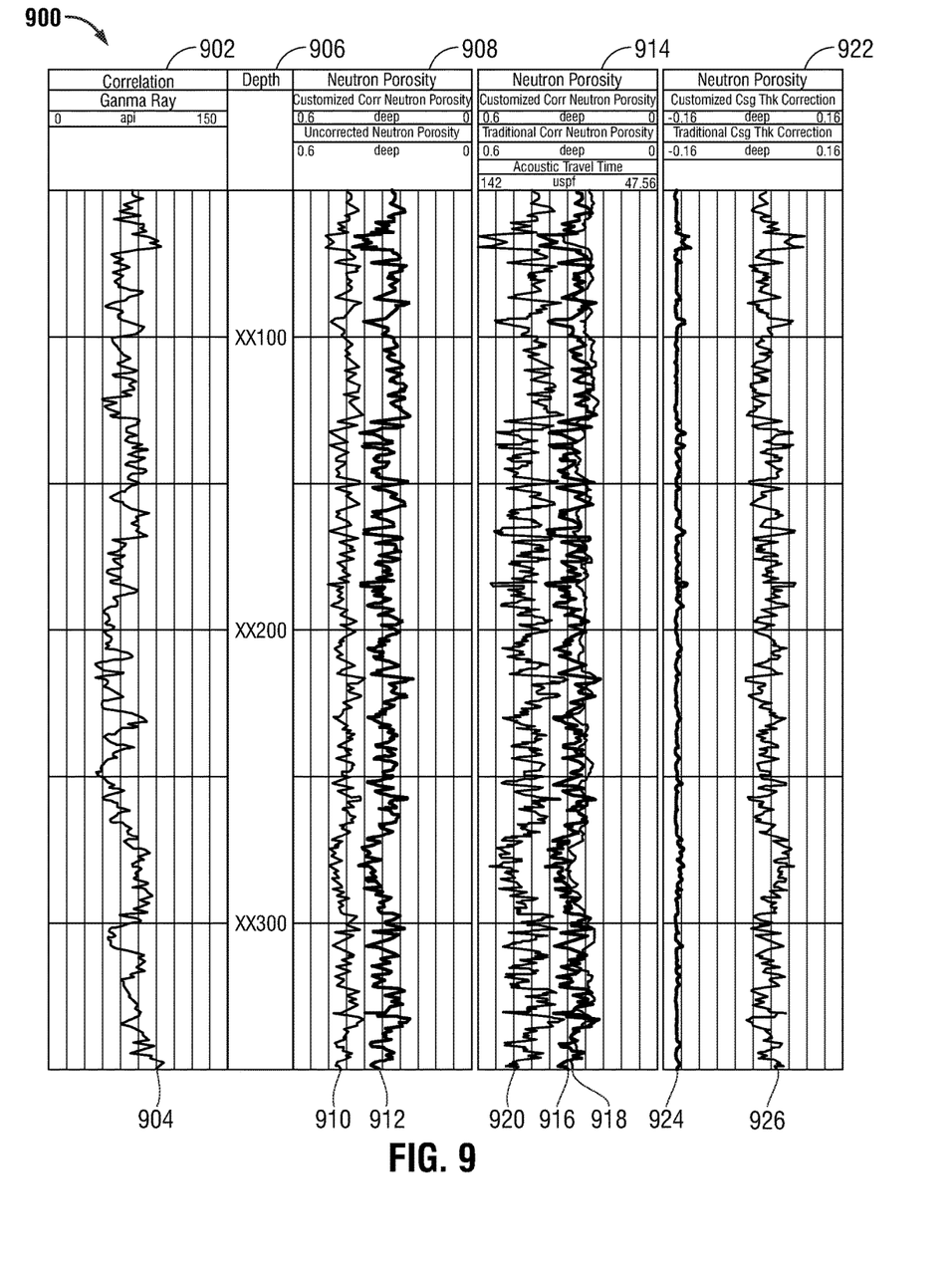
FIG. 9 illustrates an exemplary neutron log that was corrected using a customized casing thickness correction function according to the disclosed embodiments.

FIG. 9 illustrates an exemplary neutron log 900 that was corrected using a customized casing thickness correction function according to the disclosed embodiments. The neutron log 900 represents a neutron porosity log that was recorded in a deepwater Gulf of Mexico well drilled with a 14-inch bit. The well was cased with a 10.125-inch, 79-lbm/ft. casing surrounded by a class H cement sheath. In this example, the casing thickness was 0.795 inches. No open hole nuclear logs were recorded in the well. Environmental corrections were applied to the neutron porosity log to obtain corrected neutron porosity results using traditional casing thickness corrections and the customized casing thickness correction function disclosed herein.

In FIG. 9, a number of tracks are shown, including a correlation track 902 having a gamma ray log 904 in API (American Petroleum Institute) units. Logging depth is indicated at 906. Also shown is a neutron porosity track 908 having an uncorrected neutron porosity log 910 (in decimal porosity units (decp)) and a neutron porosity log 912 that was corrected using the customized casing thickness correction function disclosed herein. A porosity track 914 shows the resulting porosity log 916 after corrections were made using the customized casing thickness correction function disclosed herein. A compressional acoustic travel time log 918 is also provided for verification purposes. As can be seen, there is very close correlation between the corrected porosity log 916 and the compressional acoustic travel time log 918, which confirms the accuracy of the corrections made. For comparison, a porosity log 920 that was corrected using traditional chartbook casing thickness corrections is also displayed which is not confirmed by the compressional acoustic travel time log 918. A casing thickness track 922 shows the amount or magnitude of corrections made for casing thickness using the disclosed customized casing thickness correction function (line 924) and the amount of correction made for casing thickness using traditional chartbooks (line 924). These amounts confirm there is a significant difference between the customized corrections versus traditional corrections, which is consistent with the correction data presented in FIG. 8.

Figure 10:
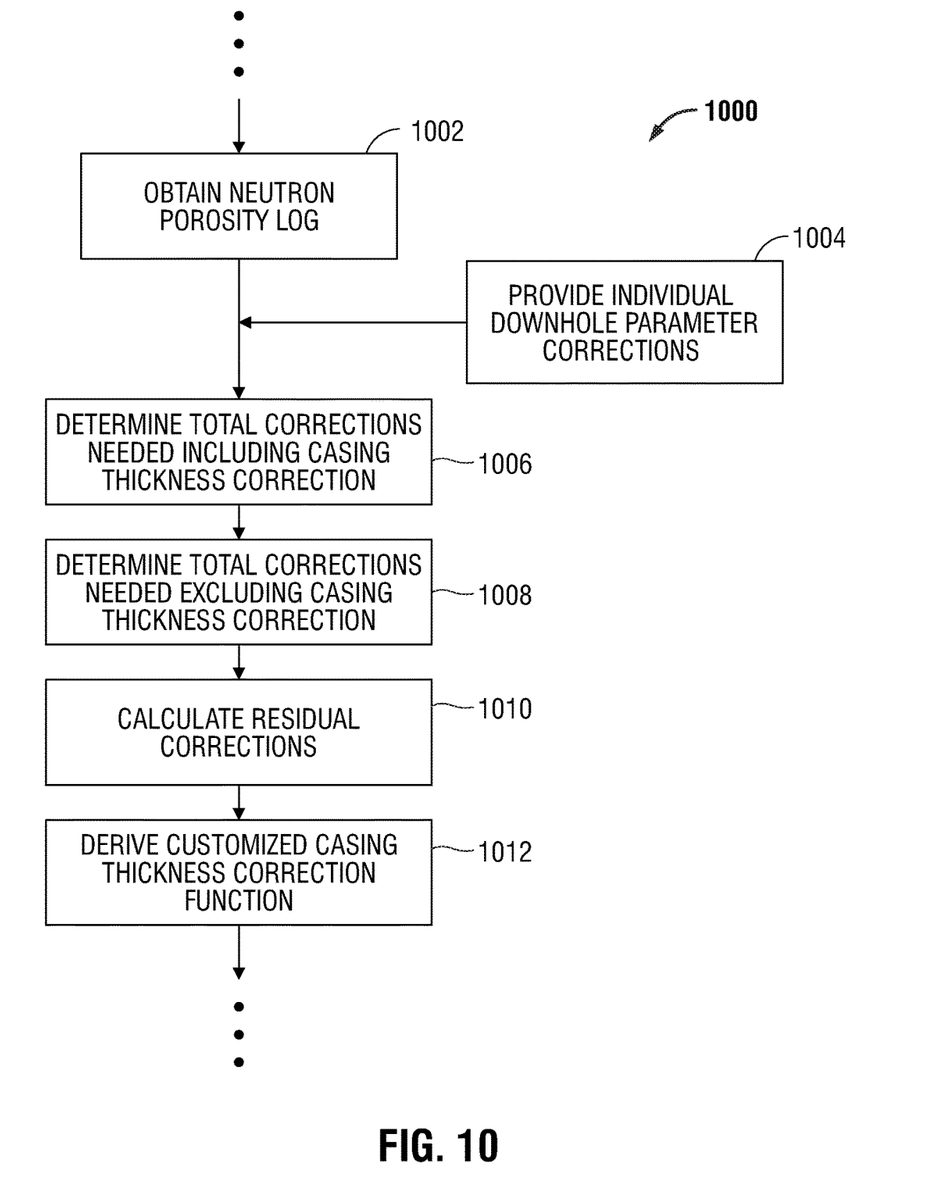
FIG. 10 illustrates an exemplary workflow that may be used with the porosity log correction application according to the disclosed embodiments.

Thus far, a number of specific implementations of a porosity log correction application have been described. Following now in FIG. 10 are general guidelines in the form of a flow chart 1000, or portion thereof, outlining a method that may be used to implement the porosity log correction application. Those having ordinary skill in the art will understand of course that alternative arrangements may be derived from the teachings presented herein without departing from the scope of the disclosed embodiments.

As can be seen in FIG. 10, the flow chart 1000, or portion thereof, begins at block 1002 where a neutron porosity log is obtained for the well being investigated, such as a deepwater well, via a neutron logging tool. Next, at block 1004, individual environmental parameter corrections, including casing thickness correction, are provided for each parameter in a set of environmental parameters for the well. These environmental parameters include all environmental parameters that a person of ordinary skill in the art would need to describe the downhole conditions of the well.

Thereafter, at block 1006, total corrections are determined, including casing thickness influences, over a range of formation porosities (e.g., 0 to 100 p.u.). These total corrections are the porosity corrections that would be needed to correct the apparent (uncorrected) neutron porosity log to the true porosity values that would have been observed had the log been recorded under standard logging conditions. At block 1008, a second set of total corrections are determined, but this time excluding casing thickness influences. Residual corrections are then calculated at block 1010 over the range of formation porosities by taking a difference between the total corrections including casing thickness influences and the total corrections excluding casing thickness influences. A customized casing thickness correction function may then be derived at block 1012 based on the residual corrections.

Accordingly, as set forth above, the embodiments disclosed herein may be implemented in a number of ways. For example, in general, in one aspect, the disclosed embodiments relate to a system for correcting cased hole neutron porosity logs for a particular well. The system comprises, among other things, a logging tool disposed having a neutron source coupled thereto. The system further comprises one or more neutron detectors disposed on the logging tool, the one or more neutron detectors detecting neutrons from the neutron source. A well logging system is coupled to the one or more neutron detectors, the well logging system operable to adjust a neutron porosity log for the well to correct for one or more environmental parameter influences using a correction function that is customized specifically for the well.

In general, in another aspect, the disclosed embodiments relate to a method of correcting cased hole neutron porosity logs for a particular well. The method comprises, among other things, lowering a logging tool into a casing of the well, the logging tool having a neutron source coupled thereto and detecting neutron count rates from one or more neutron detectors disposed on the logging tool. The method further comprises obtaining a neutron porosity log for the well from the neutron count rates and adjusting the neutron porosity log for the well to correct for one or more environmental parameter influences using a correction function that is customized specifically for the well.

In general, in another aspect, the disclosed embodiments relate to a computer-readable medium storing computer-readable instructions for correcting cased hole neutron porosity logs for a particular well. The computer-readable instructions cause a computing system to, among other things, receive neutron count rates detected by a logging tool disposed within a casing of the well and obtain a neutron porosity log for the well from the neutron count rates. The computer-readable instructions further cause a computing system to adjust the neutron porosity log for the well to correct for one or more environmental parameter influences using a correction function that is customized specifically for the well.

In accordance with any one or more of the foregoing embodiments, the correction function includes a casing thickness response function that is customized specifically for the well.

In accordance with any one or more of the foregoing embodiments, the casing thickness response function is customized for the well by taking differences between the total corrections for the well including casing thickness influence correction and the total corrections for the well excluding casing thickness influence correction.

In accordance with any one or more of the foregoing embodiments, the casing thickness response function is in the form of a mathematical equation, such as a polynomial.

In accordance with any one or more of the foregoing embodiments, the one or more environmental parameters include casing inside diameter, casing fluid density, casing fluid salinity, formation temperature, and formation pressure.

In accordance with any one or more of the foregoing embodiments, the well is a deepwater well having a water depth of 5000 feet or more.

In accordance with any one or more of the foregoing embodiments, wherein a casing is disposed within the well and the logging tool is disposed within the casing, and wherein the casing has a casing thickness that is thicker than a casing thickness of casings in shallow-water and on-land wells.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A system for correcting cased hole neutron porosity logs for a particular well, comprising:
a logging tool having a neutron source coupled thereto;
one or more neutron detectors disposed on the logging tool, the one or more neutron detectors detecting neutrons from the neutron source; and
a well logging system coupled to the one or more neutron detectors, the well logging system operable to adjust a neutron porosity log for the well to correct for one or more environmental parameter influences using a correction function that includes a casing thickness response function that is customized specifically for the well by taking differences between (i) a total corrections for the well including casing thickness influence correction and (ii) a total corrections for the well excluding casing thickness influence correction, to obtain a plurality of residual correction points;

wherein the casing thickness response function comprises a fifth-order polynomial fitted to the plurality of residual correction points.

2. The system of claim 1, wherein the one or more environmental parameters include casing inside diameter, casing fluid density, casing fluid salinity, formation temperature, and formation pressure.

3. The system of claim 2, wherein the well is a deepwater well having a water depth of 5000 feet or more.

4. The system of claim 2, wherein:
a casing is disposed within the well
the logging tool is disposed within the casing; and
the casing has a casing thickness that is thicker than a casing thickness of casings in shallow-water and on-land wells.

5. A method of correcting cased hole neutron porosity logs for a particular well, comprising:
lowering a logging tool into a casing of the well, the logging tool having a neutron source coupled thereto;
detecting neutron count rates from one or more neutron detectors disposed on the logging tool;
obtaining a neutron porosity log for the well from the neutron count rates; and
adjusting the neutron porosity log for the well to correct for one or more environmental parameter influences using a correction function that includes a casing thickness response function that is customized specifically for the well wherein the casing thickness response function is customized for the well by taking differences between (i) a total corrections for the well including casing thickness influence correction and (ii) a total corrections for the well excluding casing thickness influence correction, to obtain a plurality of residual correction points;
wherein the casing thickness response function comprises a fifth-order polynomial fitted to the plurality of residual correction points.

6. The method of claim 5, wherein the one or more environmental parameters include casing inside diameter, casing fluid density, casing fluid salinity, formation temperature, and formation pressure.

7. The method of claim 6, wherein the well is a deepwater well having a water depth of 5000 feet or more.

8. The method of claim 6, wherein the casing has a casing thickness that is thicker than a casing thickness of casings in shallow-water and on-land wells.

9. A non-transitory computer-readable medium storing computer-readable instructions for correcting cased hole neutron porosity logs for a particular well, the computer-readable instructions causing a computing system to:
receive neutron count rates detected by a logging tool disposed within a casing of the well;
obtain a neutron porosity log for the well from the neutron count rates; and
adjust the neutron porosity log for the well to correct for one or more environmental parameter influences using a correction function that includes a casing thickness response function that is customized specifically for the well by taking differences between (i) a total corrections for the well including casing thickness influence correction and (ii) a total corrections for the well excluding casing thickness influence correction, to obtain a plurality of residual correction points;
wherein the casing thickness response function comprises a fifth-order polynomial fitted to the plurality of residual correction points.

10. The computer-readable medium of claim 9, wherein the one or more environmental parameters include casing inside diameter, casing fluid density, casing fluid salinity, formation temperature, and formation pressure.

11. The computer-readable medium of claim 10, wherein the well is a deepwater well having a water depth of 5000 feet or more or the casing has a casing thickness that is thicker than a casing thickness of casings in shallow-water and on-land wells.

* * * * *